United States Patent [19]

Yamada

[11] Patent Number: 5,407,043
[45] Date of Patent: Apr. 18, 1995

[54] SYNCHRONIZER RING AND MANUFACTURING METHOD THEREOF

[75] Inventor: Shigeki Yamada, Nagoya, Japan

[73] Assignee: Aisan Kogyo Kabushiki Kaisha, Ohbu, Japan

[21] Appl. No.: 47,194

[22] Filed: Apr. 16, 1993

[30] Foreign Application Priority Data

May 21, 1992 [JP] Japan .................................. 4-128723

[51] Int. Cl.$^6$ ........................ F16D 69/00; F16D 23/06
[52] U.S. Cl. ........................ 192/107 M; 192/53 F; 192/107 R
[58] Field of Search ............ 192/107 M, 53 F, 107 R; 148/436

[56] References Cited

U.S. PATENT DOCUMENTS

| | | | |
|---|---|---|---|
| 4,679,681 | 7/1987 | Creydt et al. | 192/53 F X |
| 4,874,439 | 10/1989 | Akutsu | 192/107 M X |
| 4,931,117 | 6/1990 | Müller et al. | 192/107 M X |
| 4,943,321 | 7/1990 | Akutsu | 192/107 M X |
| 4,944,378 | 7/1990 | Christian | 192/53 F X |
| 5,105,522 | 4/1992 | Gramberger et al. | 192/107 M X |
| 5,249,661 | 10/1993 | Kawamura et al. | 192/107 M |

FOREIGN PATENT DOCUMENTS 4972842 10/1947 Japan .
55-7414 1/1980 Japan .

*Primary Examiner*—Rodney H. Bonck
*Attorney, Agent, or Firm*—Cushman, Darby & Cushman

[57] ABSTRACT

A synchronizer ring and a manufacturing method thereof having an object to reduce the manufacturing cost and to improve its durability. Therefore, the synchronizer ring according to the invention includes a coating formed by thermal spraying of wear-resistant material on a conical surface of the synchronizer ring body which has been subjected to mechanical machining, pressing a conical jig having a predetermined opening angle against the coated surface in a manner to exert a surface pressure of 4 to 40 N/mm$^2$ on the coated surface, and rotating the conical jig in a range of 45 to 590 degrees, to thereby make the heights of projections of the surface of the coating uniform.

3 Claims, 4 Drawing Sheets

SYNCHRONIZER RING AND MANUFACTURING METHOD THEREOF

BACKGROUND OF THE INVENTION

1. Field of the Invention

The present invention relates to a synchronizer ring used for a synchromesh mechanism of a gear transmission in an automobile, and a manufacturing method thereof.

2. Description of the Prior Art

Referring to FIGS. 6 and 7, a synchromesh mechanism of a speed reduction gear as shown wherein the revolution speed is changed by synchronizing the rotational speed of a clutch hub sleeve of a shaft to driving a counter gear as synchronized with the rotational speed of a mesh gear. Generally, the synchromesh mechanism has the following structure.

The synchromesh mechanism comprises the clutch hub sleeve 1, a clutch hub 2, a synchronizer ring 3, a shifting key 4 and a key spring 5. The clutch hub 2 is closely fitted on the shaft 6 by splines to rotate with the shaft 6. Furthermore, the clutch hub sleeve 1 is closely fitted on the outer periphery of the clutch hub 2 by splines.

In order to change the revolutions of the gear when a change lever (not shown) is lightly shifted from a neutral position to a direction for changing the revolutions, the clutch hub sleeve 1 is moved with the shifting key 4 by a fork (not shown). Then, the end of the shifting key 4 presses the shoulder portion of the synchronizer ring 3, to thereby press a conical surface 3a of the synchronizer ring 3 against a conical surface 7a of a piece gear 7 in mesh with the other side of the synchronizer ring 3.

In consequence, due to a light friction force between these two conical surfaces 3a and 7a, the rotation of the piece gear 7 varies in accordance with that of the synchronizer ring 3, and the piece gear 7 starts to increase or reduce the speed (starts the synchronizing operation). When a force is further exerted on the clutch hub sleeve 1, the clutch hub sleeve 1 overcomes a tensile force of the key spring 5 and moves to a further extent while depressing the shifting key 4. Thus, the synchronizer ring 3 is strongly pressed against the conical surface 7a of the piece gear 7 to increase the friction force between these two members and to synchronize rotation of the clutch hub sleeve 1 and the rotation of the piece gear 7 with each other, so that the clutch hub sleeve 1 is brought into engagement with the piece gear 7, thereby changing the revolutions.

In order to obtain an appropriate friction force between the conical surface 3a of the synchronizer ring 3 and the conical surface 7a of the piece gear 7, the conical surface 3a of the synchronizer ring 3 is screw-threaded to remove lubrication oil, and after molybdenum is coated on the screw-threaded portion by thermal spraying, a grinding process is given on the top portion of the screw thread. Thus, lubrication oil is wiped from the conical surface 7a by the screw-threaded portion, to increase the friction force and to improve the durability (see, for example, FIG. 3 of Japanese Utility Model Unexamined Publication No. 55-7414).

If the grinding process is not performed, the coated surface will be largely uneven, and projecting parts of the uneven surface will firstly abut against the conical surface of the gear and come off or be deformed, thus increasing the inner diameter of the synchronizer ring. In this case, a gap G between the end surface of the gear and the end surface of the synchronizer ring on the larger-diameter side is decreased (see FIG. 7), and the end surface 3b of the synchronizer ring on the larger-diameter side is brought into contact with the end surface 7b of the piece gear 7 before the friction force between the conical surface 3a of the synchronizer ring 3 and the conical surface 7a of the piece gear 7 reaches a sufficient value. As a result, the synchronizing operation can not be carried out, and an uncomfortable phenomena such as the so-called gear noise are induced.

Also, as disclosed in Japanese Utility Model Unexamined Publication No. 49-72842, thermal spraying is performed to form a coating layer, and thereafter, the coating layer is screw-threaded. However, this method involves a drawback in that a material for thermal spraying is expensive.

SUMMARY OF THE INVENTION

It is therefore an object of the present invention to provide a manufacturing method of a synchronizer ring in which the conical surface can be finished by a simple process instead of the grinding process after a wear-resistant material is coated on the synchronizer ring by thermal spraying, and to provide such a synchronizer ring, thereby reducing the costs for manufacturing the synchronizer ring and improving its durability.

In order to achieve this object, a manufacturing method of a synchronizer ring of a gear transmission according to the invention, in which a conical surface of the synchronizer ring and a conical surface of a speed change gear abut against each other for a synchronizing operation, is characterized in that it comprises the steps of coating the conical surface of the synchronizer ring body which has been subjected to mechanical machining, by thermal spraying of wear-resistant material, pressing a conical jig having a predetermined opening angle against the coated surface in a manner to exert a predetermined surface pressure on the coated surface, and rotating the conical jig, to thereby uniform heights of projections of the surface of the coating.

It is more effective when the conical jig is pressed and rotated through an angle in a range of 45° to 590°.

Furthermore, a synchronizer ring according to this invention includes a coated surface formed by a thermal spraying of wear-resistant material on a conical surface of the synchronizer ring body, pressing a conical jig against the conical surface and rotating it, and the coated surface has a ten-point average roughness of 22 to 67 $\mu$mRz and a plateau ratio of hp40-hpl:35 $\mu$m.

DETAILED DESCRIPTION OF THE PREFERRED EMBODIMENTS

Figure 1A:
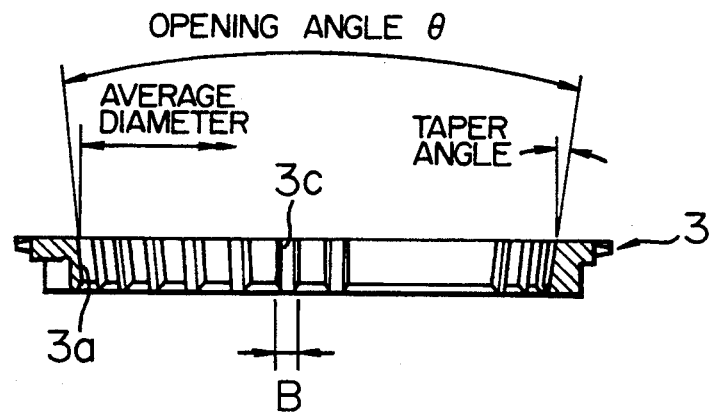
FIGS. 1A, 1B and 1C are partially vertical cross-sectional views for explaining a manufacturing method according to the present invention.

FIG. 1A shows a synchronizer ring 3 after mechanical machining, which is made of high-strength brass. Generally, a base material such as copper, iron, aluminum alloy and so forth may be used. Usually, after subjecting a billet to hot forging, it is machined, by a cutting process, into a shape shown in the illustration. Instead of forging shaping, however, sintering shaping or the like may be performed, and a ring may be finished by cutting after sintering. A conical surface 3a of the synchronizer ring 3 is formed in such a manner that planes including diametrically opposite portions of the wall define an opening angle $\theta$ of 14°, and that an each-side taper angle is 7° which is half of the opening angle. Twenty-one vertical grooves 3c are formed in the conical surface 3a at equal intervals. Each groove has a width B of 4 mm, and an average diameter of the conical surface 3a is 89.6 mm.

Figure 1B:
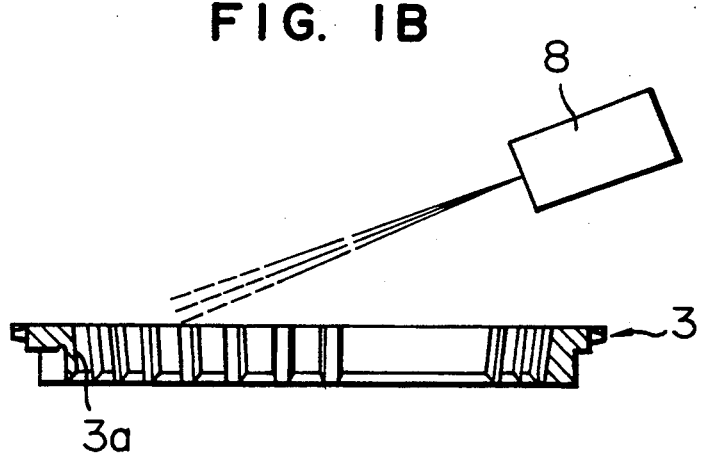

Next, as shown in FIG. 1B, melted Al-15Si+50Mo alloy is sprayed on the conical surface 3a of the synchronizer ring 3 from a plasma thermal-spraying torch 8, to form a coating having a thickness of 0.1 to 0.2 mm. As an apparatus for thermal spraying, an SG-100 manufactured by Miller (transliteration) is employed.

The conical surface (3a) after thermal spraying has a ten-point average roughness of 72 $\mu$mRz and a plateau ratio of hp40-hpl:46 $\mu$m. The roughness of the coated surface at this time is depicted by a curve in FIG. 2.

Figure 1C:
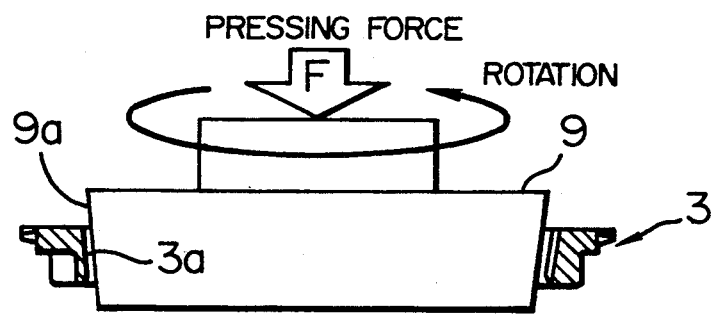

As shown in FIG. 1C, a conical jig 9 includes a conical surface 9a having an opening angle of 14°. The conical surface 9a is pressed against the conical surface 3a on which the coating is formed, and it is rotated through an angle of 270°, so as to uniformly alter the heights of the projections of the conical surface 3a. A favorable result is obtained when a substantial surface pressure exerted on the conical surface 3a at this time is in a range of 4 to 40 N/mm². If it exceeds 40 N/mm², deformation of the synchronizer ring and excessive depression of the surface of the coating are induced.

Figure 2:
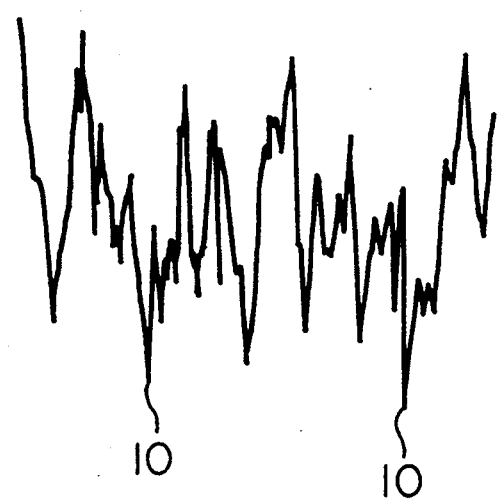
FIG. 2 is a curve showing the roughness of a conical surface of a synchronizer ring in a step of the manufacturing method according to the invention.
Figure 3:
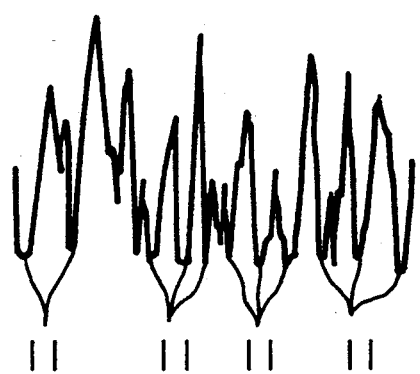
FIG. 3 is a curve showing the roughness of the finished conical surface of the synchronizer ring according to the manufacturing method of the invention.

A roughness curve of the coated surface when the substantial surface pressure during pressing and rotation of the conical jig 9 is 15 N/mm² is shown in FIG. 3. Tips of sharp projections 10 shown in FIG. 2 are depressed, as indicated by reference numerals 11 in FIG. 3, and heights of the projections are made to be uniform.

As the conical jig 9, a jig obtained by cutting a material of SK5 (JIS) and hardening/grinding is used.

The surface pressure is defined as follows:

Surface Pressure=$F/\{$(Contact Area)$\times$Sin($\theta$/2)$\}$ when F expresses a pressing force of the conical jig, $\theta$ expresses an opening angle, and the contact area is obtained from average diameter$\times$(length of the conical surface 3a)$-$(total area of the vertical grooves 3c).

Table 1 shows measurement data of changes in the ten-point average roughness Rz and the plateau ratio of the coated surface when varying the angle of rotation of the conical jig 9 while maintaining the surface pressure of the conical jig 9 at 15 N/mm².

TABLE 1

| Sample | Jig Rotation Angle (deg) | Roughness of Coated Surface | |
|---|---|---|---|
| | | Rz | Plateau Ratio |
| No. 1 | 0 | 70 | 45 |
| 2 | 90 | 56 | 35 |
| 3 | 180 | 43 | 27 |
| 4 | 270 | 34 | 23 |
| 5 | 360 | 25 | 19 |
| 6 | 540 | 22 | 14 |
| 7 | 720 | 20 | 11 |
| 8 | 900 | 18 | 9 |

Figure 4:
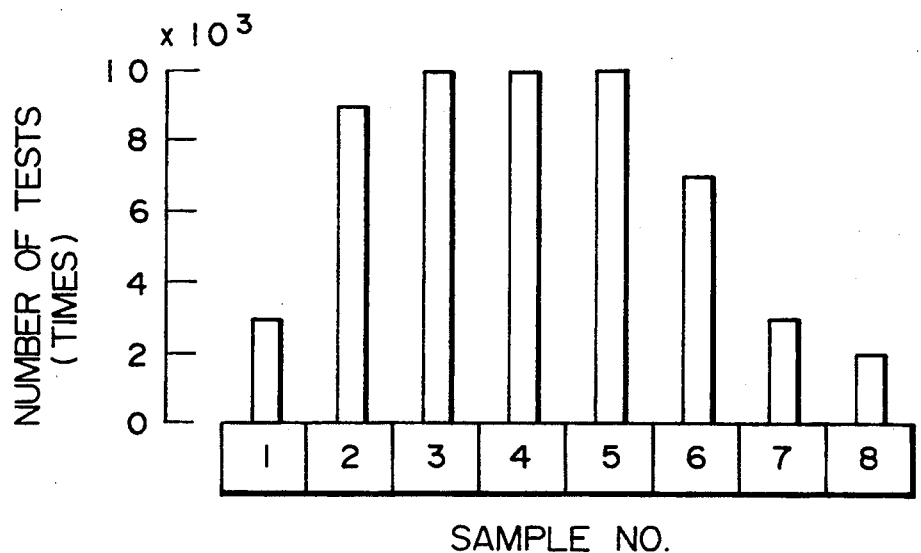
FIG. 4 is a chart showing results of durability tests when the manufacturing method, especially an angle of pressing rotation of a conical jig, is changed.

Samples 1 to 8 shown in Table 1 were subjected to accelerated durability tests. It was found that Samples 2 to 6 attained the target value of the number of tests which was 5000, but that when the angle of rotation of the conical jig 9 was below a predetermined value or exceeded it the durability of the sample was short and unpractical. The results are shown in FIG. 4. As obvious from these results, the angle of rotation of the conical jig 9 should preferably be 45° to 590°. Moreover, as obvious from Table 1, the ten-point average roughness of the coated surface after the pressing rotation should preferably be 22 to 67 $\mu$mRz.

It should be noted that constant results can be obtained if the angle of rotation of the conical jig 9 is 360° or less because the surface roughness after thermal spraying is increased under a certain condition of thermal spraying.

Furthermore, synchronizer rings 3 were manufactured by changing the surface pressure to be 0, 5, 20, 35, 50 and 70 N/mm² in the process shown in FIG. 1C, and durability tests were performed with these synchronizer rings incorporated in gear transmissions. As a result, when the surface pressure was zero, i.e., when the conical member 9 was not pressed, the gap G between the synchronizer ring and the gear varied largely, and the durability was short.

When the surface pressure was 5, 20 and 35 N/mm², the variation of the gap G between the synchronizer ring and the gear was small, and the number of tests exceeded the target value in every case.

When the surface pressure was 50 and 70 N/mm², the durability was deteriorated, and the result was unfavorable although variation of the gap G between the synchronizer ring and the gear was small.

From the above-described results, it can be understood that the coated surface with fine pits and projections is made smoother under the surface pressure of a predetermined value or more, and that heights of projections of the coated surface are made to be uniform, so that the variation of the gap G between the synchronizer ring and the gear is lessened.

Moreover, when the surface pressure was 50 and 70 N/mm² larger than the predetermined value, the tips of the projections on the coated surface were deformed so largely that removal of oil film from the conical surface 7a of the gear was insufficient at the time of the operation of the synchronizer ring, and that a friction coefficient required for synchronization could not be obtained. In consequence, uncomfortable gear noise was generated in a short time in durability tests.

Figure 5:
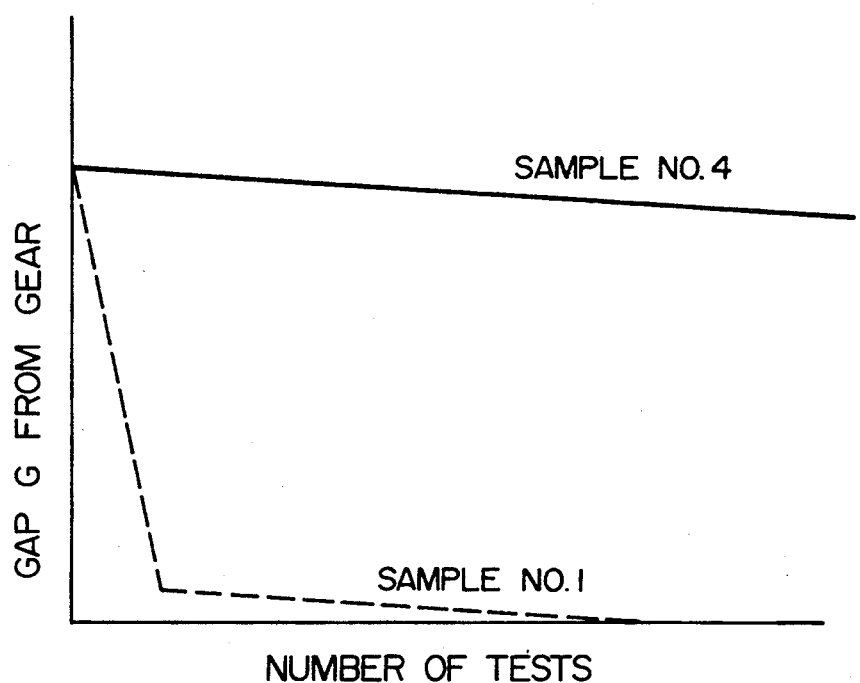
FIG. 5 is a graph illustrative of relationship between the number of tests of synchronizer rings and the gap G between each synchronizer ring and a gear.
Figure 6:
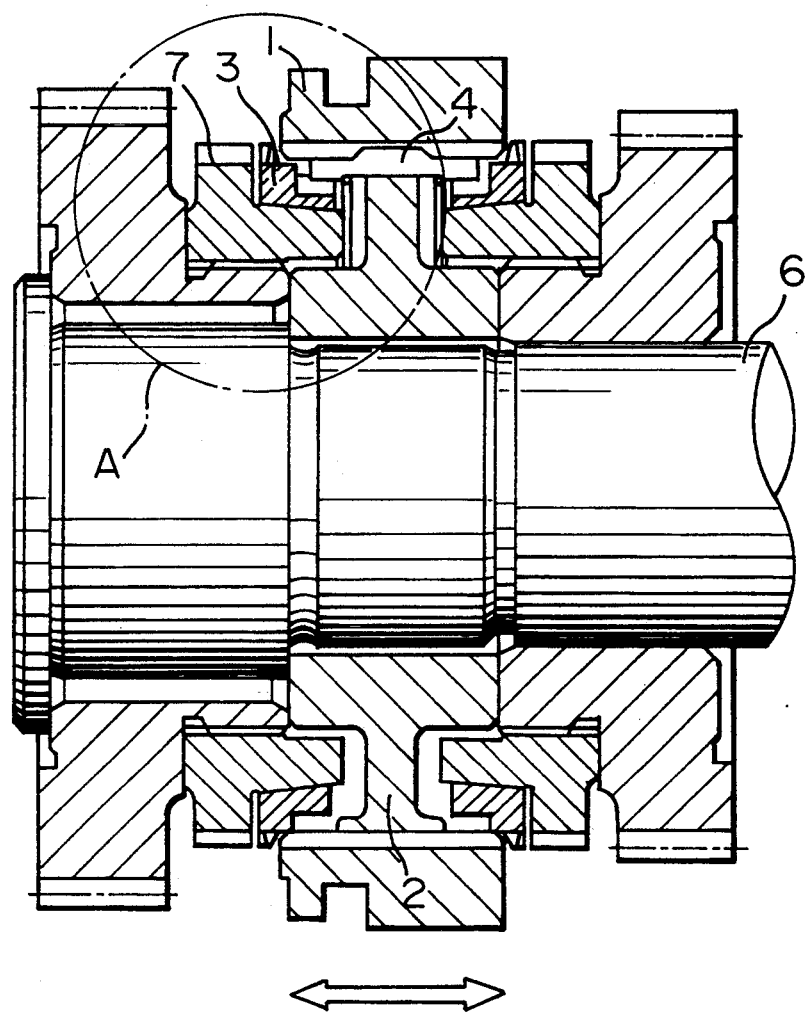
FIG. 6 is a vertical cross-sectional view showing a synchronizer mechanism of a gear transmission.
Figure 7:
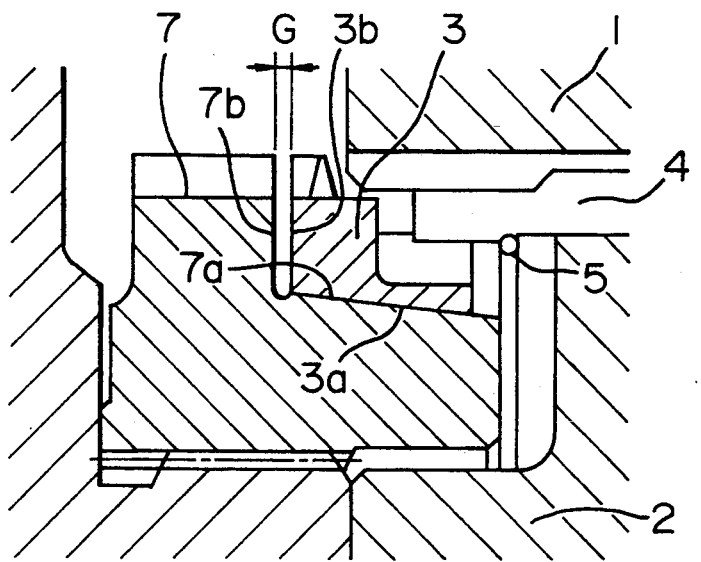
FIG. 7 is an enlarged view of the portion A of FIG. 6.

Furthermore, when the conical member was merely pressed without rotation, as indicated by the data of the sample No. 1 shown in FIG. 5, plastic deformation of the coated surface was caused immediately after the start of durability tests, and gear noise was generated at the smaller number of tests in comparison with the sample No. 4 rotated through an angle of 270°. The reason is thought to be that heights of the tips of projections of the uneven coated conical surface 3a of the synchronizer ring 3 vary so largely that the conical surface 3a will not uniformly abut against the gear conical surface 7a, and that the projections of the coated surface 3a will be contacted with it only partially, to thereby increase the substantial surface pressure in the tips of these contacted projections extraordinarily.

As the samples used for the durability tests shown in FIG. 5, several samples were prepared for each kind. The gap G between each sample and the gear was obtained by dividing the periphery into equal sections, measuring three gaps, and deriving the average of the three.

According to the present invention, since it is not necessary to screw-thread the coating layer, the necessary amount of thermal spraying material is small, and the cost for the material can be reduced. Moreover, pressing and rotation of the conical member serve to depress the tips of projections of the coating to make the heights of the projections uniform. Consequently, the variation of the gap between the synchronizer ring and the gear is decreased, and there are less defective products produced which interfere with other parts because of the gap being too small or too large as compared with the specified value. As a result, the manufacturing cost can be reduced.

Furthermore, since the projections of the surface of the coating have uniform heights, it is possible to avoid the unfavorable phenomenon that plastic deformation is induced because the surface pressure is locally increased when the projections having large heights alone are contacted with the conical surface of the associated gear. Thus, the durability can be improved.

What is claimed is:

1. A synchronizer ring including a coating of wear-resistant material which is formed on a conical surface of a body of said synchronizer ring by thermal spraying and by pressing and rotating a conical jig against said conical surface, said conical surface having a ten-point average roughness of 22 to 67 $\mu$mRz and a plateau ratio of hp40-hpl:35 $\mu$m.

2. A synchronizer ring including a coating of wear-resistant material which is formed on a conical surface of a body of said synchronizer ring, said conical surface having a ten-point average roughness of 22 to 67 $\mu$mRz and a plateau ratio of hp40-hpl:35 $\mu$m.

3. A synchronizer ring including a coating of wear-resistant material which is formed on a conical surface of a body of said synchronizer ring, said conical surface having a plateau ratio of hp40-hpl:35 $\mu$m.

* * * * *